United States Patent Office 3,639,340
Patented Feb. 1, 1972

3,639,340
THERMOSTABLE POLYMERS OBTAINED FROM PHENOLS AND AROMATIC TETRACARBOXYLIC ACID ANHYDRIDES
Maurice Balme and Maurice Ducloux, Lyon, France, assignors to Rhone-Poulenc S.A., Paris, France
No Drawing. Filed July 8, 1968, Ser. No. 743,009
Claims priority, application France, July 13, 1967, 114,382
Int. Cl. C08b 33/10
U.S. Cl. 260—47 CP
9 Claims

ABSTRACT OF THE DISCLOSURE

Novel thermostable polymers are made by polycondensing a phenol or polyphenol with a dianhydride of formula:

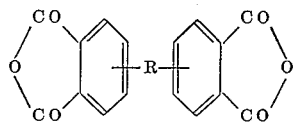

or a corresponding tetracid, in which R represents a simple valence bond or one of the following divalent radicals: —O—, —S—, —SO$_2$—, —NH—, —NR'—, —N=N—,

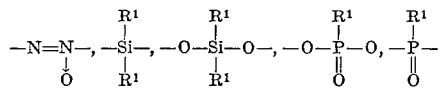

—CHOH—, —CO—, —C(CH$_3$)$_2$—,

—CO—C$_6$H$_4$—CO— and —CHOH—C$_6$H$_4$—CHOH—, R$^1$ representing a lower alkyl, cycloalkyl or aryl radical.

The present invention relates to thermostable polymers obtained from phenols.

The products of condensation of phenols and the aromatic anhydrides have long been known (A. Baeyer., Ber. (1871) 658–65), but the literature relating to them is principally concerned with the preparation of phthalein structures having colouring properties (Baeyer loc. cit.; Loiwal, S. D. et al., Chem. Abs. 59 89 O2h). Consequently, the products which have been made have generally not been very highly condensed. Some polymers have been prepared from pyromellitic dianhydride, particularly with the object of obtaining semiconductors (Austral. J. Chem., 12 643–65 (1959)) but these polymers have bad mechanical properties, which makes them unsuitable for the manufacture of thermostable laminates and mouldings suitable for commercial use.

A new series of polymers has now been found, with which it is possible to obtain materials having remarkable thermostability combined with good mechanical properties, this making them capable of being used particularly for the manufacture of moulded objects, laminates and varnishes.

The polymers of the invention are polycondensates obtained from monophenols or polyphenols and dianhydrides of formula:

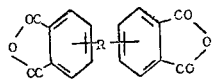

or the corresponding tetracids, in which R represents a simple valence bond or one of the following divalent radicals: —O—, —S—, —SO$_2$—, —NH—, —NR'—, —N=N—,

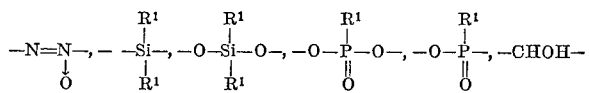

—CO—, —C(CH$_3$)$_2$—, —CO—C$_6$H$_4$—CO—, and

—CHOH—C$_6$H$_4$—CHOH—

R$^1$ representing a lower alkyl, cycloalkyl or aryl radical (by "lower" is meant radicals containing from 1 to 8 carbon atoms).

Dianhydrides which are of particular interest are the dianhydrides of azophthalic and azoxyphthalic acids.

Among the phenols which can be used for forming the polymers of the invention, phenol, the cresols, pyrocatechol, resorcinol, hydroquinone, anthrahydroquinone, 1,2,3-, 1,3,5-, and 1,24-trihydroxybenzenes, trimethylolphenol, the naphthols, the dihydroxy-biphenyls, bis-(4-hydroxyphenyl)methane, and bis-2,2-(p-hydroxyphenyl) propane are especially suitable.

It is obviously possible to use several dianhydrides (or tetracids) and/or several phenols simultaneously.

The polymers of the invention are prepared by heating the reactants, preferably with elimination of the water formed during the reaction.

When it is desired to obtain moulded objects or laminates, it is expedient not to effect a complete polycondensation of the reactants, but initially only to effect partial polycondensation; the polycondensation is then completed, possible under pressure, on the shaped object.

In practice, it is advantageous to operate as follows. The dianhydride (or the corresponding tetracid) is mixed with the phenol. A catalyst, such as para-toluenesulphonic acid, can be added. In certain cases, it is possible to work without the catalyst, particularly when the presence thereof would be detrimental to the final polymer. The presence of such catalysts can cause a lowering of the thermal stability. It is frequently advisable for the reactants to have added thereto a small quantity of a solvent, such as benzene, capable of forming an azeotrope with water, this permitting, at the time of the subsequent heating, an estimate of the progress of the reaction, by measurement of the quantity of water which has been entrained.

The proportion of phenol used is higher than 0.5 mole per mole of anhydride and is preferably between 1.5 and 3 moles. A deficiency of phenol leads to a product having inferior properties and makes difficult the agitation during polycondensation. An excess of phenol is not disturbing and even facilitates the agitation during polycondensation, but lengthens the purification required for the polymer.

The mixture of phenol and dianhydride (or tetracid) is heated, preferably with agitation, to a temperature between 100 and 400° C. and advantageously between 120 and 250° C. The reaction is continued until more than 0.5 mole of water per mole of initially introduced dianhydride, and preferably 0.9 to 1.5 moles of water, has been removed. When a tetracid is used instead of an anhydride, it is obviously necessary to add 2 moles of water to the figures indicated. If the reaction mixture contains an excess of phenol, this excess can be eliminated where volatile phenols are concerned, by heating under reduced pressure. With non-volatile phenols, it is preferable to avoid the use of an excess of phenol, as this necessitates a purification of the polymer obtained.

The excess phenol can also be eliminated with a solvent without any action on the polymer. It is desirable to have the least possible quantity of phenol in the polymer, so that when a shaped object is baked, the least possible quantity of volatile materials is released, and there is no substantial alteration in the appearance and the properties of the object.

After cooling, the polymer can be used for making moulded objects or laminates. It is expedient to crush the said polymer to form a powder therefrom, as such a powder can be more easily handled. This powder can optionally undergo a supplementary heat treatment to increase its degree of crosslinking. Two possibilities exist for shaping this polymer powder, either in a mould or in association with a fabric (laminate). The polymer can be directly shaped in powder form, and this is the most advantageous solution for the manufacture of moulded articles. It is also possible to make solutions of the polymer in a polar solvent, particularly dimethyl formamide (DMF), dimethyl sulphoxide (DMSO), hexamethyl phosphotriamide (HMPT), N-methylpyrrolidine (NMP), and the tertiary amines such as pyridine. This process is more advantageous for the laminates, because it enables the fabrics to be better impregnated. Once the fabric is impregnated, it is then necessary to evaporate the solvent.

After this preliminary shaping for the purpose of obtaining the shaped object, it is sufficient to heat the polymer, preferably under pressure. Generally, it is advantageous to heat for less than 5 hours at temperatures of the order of 200 to 450° C., and preferably from 280 to 400° C. The degree of pressure applied is not critical.

The polymers according to the invention can have a hardener added thereto, before the final heating. Generally speaking, a "hardener" means a product causing crosslinking or elongation of the polymer chains or the formation of branchings by reaction with the chemical functions which are present. Suitable hardeners are aromatic polyamines, such as one of the three phenylene diamines, 4,4' - diaminodiphenyl, bis-(4-aminophenyl)-methane, 2,6-diaminopyridine, and 2-aminopentyl-4,5H-amino-6,7-dihydrocyclopenta-d-pyrimidine of formula:

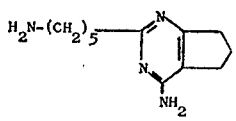

The hardener can also be formaldehyde, a diisocyanate, or hexamethylene tetramine. In order that the hardener may have its full efficiency, it is preferable to add it to a solution of the polymer of the invention and not to the crushed polymer, so that it is mixed more intimately with the polymer.

The following examples illustrate the invention. In these examples, the flexure test is carried out according to the ASTM standard D790-63, the span being 50 mm. for the tests on laminates and 25.4 mm. for the tests on mouldings.

EXAMPLE 1

Using a 1-litre, round-bottomed flask equipped with a column packed with a filling material and a Dean-Stark apparatus, a mixture of 322 g. (1.0 mole) of azophthalic anhydride, 188 g. (2.0 moles) of phenol, and 50 cc. of benzene, is progressively heated up to 180° C., while the water formed is simultaneously removed as the binary water-benzene azeotrope. The mixture is kept for 4 hours at 180° C. after which time 18.9 g. of water have been collected. The residue is then progressively heated under reduced pressure (0.1 to 1 mm. Hg) to 300° C., and 79 g. of uncombined phenol are removed. After cooling, the solid residue is finely crushed, and a powder A is obtained which has a softening point of the order of 235° C.

100 g. of this powder A are heated to 325° C. under nitrogen for 3 hours. After grinding and screening, a powder B is collected with a softening point of 415° C. 11 g. of powder B are introduced into a cylindrical mould having a diameter of 5 cm. The mould is heated for 10 minutes at 300° C. at 6 kg./cm.² and then for 1 hour at 300° C. at 200 kg./cm.².

After cooling, a disc with a thickness of 3.8 mm. is obtained. Parallelipipedic specimens with the dimensions of 3.8 x 8 x 30 mm. are obtained therefrom and strength tests comprising flexure until break are carried out thereon. The span (distance between the supports of the specimen during the application of the pressure) is 25.4 mm. A flexure strength of 6.64 kg./mm.² is found. After standing for 530 hours at 300° C. in a ventilated oven, the strength value changes to 6.87 kg./mm.².

EXAMPLE 2

Using an apparatus identical with that of Example 1, a mixture of 322 g. of azophthalic anhydride, 253 g. of phenol, and 50 cc. of benzene is heated for 4 hours at 180° C. 18.9 g. of water is liberated. After distilling off the excess of phenol, as in Example 1, followed by cooling and then grinding of the residue, there are obtained 402 g. of powder A, which softens in the region of 235° C.

50 g. of this powder A are heated for 3 hours at 325° C. under nitrogen. After grinding and screening, 45 g. of powder B are collected, of which the softening point is about 415° C.

11 g. of this powder B are placed in a cylindrical mould with a diameter of 50 mm. The mould is heated for 10 minutes at 300° C. at a pressure of 5 kg./cm.² and then for 1 hour at 300° C. at a pressure of 400 kg./cm.². A disc with a thickness of 3.9 mm. is obtained, and this is annealed under nitrogen for 192 hours while the temperature is progressively raised to 300° C. A disc having dimensions identical with those existing before the annealing operation is obtained. The resistance to flexure on break is 7.80 kg./mm.². After being left for 460 hours at 300° C. in a ventilated oven, the resistance has changed to 6.17 kg./mm.².

EXAMPLE 3

A mixture of 322 g. of azophthalic anhydride, 231 g. of phenol, and 50 cc. of benzene is heated for 4 hours at 180° C. The mixture is then heated for 1 hour at 300° C. under a pressure of 0.5 mm. Hg. After cooling and grinding, 425 g. of powder A with a softening point of the order of 240° C. are recovered. Part of this powder is heated for 1 hour at 335° C. A powder B is thus obtained which has a softening point of the order of 400° C.

1.4 g. of powder A, 6.1 g. of powder B and 1.4 g. of powdered mica (grain size, 5µ) are homogeneously mixed, and a disc similar to those of the preceding examples is formed therefrom. This disc is heated for 2 hours at 380° C. at a pressure of 100 kg./cm.². The resistance to flexure on break of the disc obtained is 5.81 kg./mm.². After standing for 51 hours at 300° C., the resistance is 4.8 kg./mm.².

EXAMPLE 4

A mixture of 43.6 g. of azophthalic anhydride, 25.35 g. of phenol, 0.4 g. of para-toluenesulphonic acid, and 20 g. of benzene is heated to 180° C., while the water formed is simultaneously distilled as a binary water-benzene azeotrope. After 7 hours, 2.6 g. of water have been collected and the mixture is allowed to cool to 140° C. 105 g. of dimethyl sulphoxide (DMSO) are then added with stirring and, after cooling, part of the solution is used for coating a glass fibre fabric of the satin type, weighing 317 g./m.², which has undergone a thermal de-oiling followed by treatment with gamma-amino-propyl triethoxysilane. After coating, the fabric is dried at 120° C. for 4 hours in an air-ventilated oven. The weight of solids applied by the coating operation represents 24% of the total weight of the coated, dried fabric.

After cooling, rectangular samples (8 cm. x 9 cm.) are cut from this fabric, and these are stacked so as to form a laminated assembly of 16 layers. This assembly is then compressed at a pressure of 25 kg./cm.² and heated in this form for 3 hours at 350° C. The laminate obtained after the heat treatment contains 18% of resin. Test elements are formed therefrom, these elements being 70 mm.

x 10 mm. with a thickness of 3 mm. The resistance to flexure on break is measured. The span (spacing of the supports) is 50 mm. This resistance is 43.6 kg./mm.$^2$.

EXAMPLE 5

The procedure of Example 4 is followed, with a mixture consisting of 30 g. of azoxyphthalic anhydride, 36.7 g. of phenol, 0.3 g. of para-toluenesulphonic acid, and 20 g. of benzene. After 5 hours, 2.29 g. of water have been collected. The residual mixture is dissolved in 110 cc. of N-methyl-pyrrolidone and part of the solution is used for coating 15 rectangular specimens (8 cm. x 9 cm.) of glass fabric identical with that which was used in Example 4. The coated samples are dried for 1 hour at 120° C. in an air-ventilated oven and then for 1 hour at 160° C. under reduced pressure (200 mm. Hg).

A laminate is obtained by compression of the assembly under a pressure of 32 kg./cm.$^2$ at 350° C. for 3 hours. It contains 13.3% by weight of resin and has a resistance to flexure on break, measured as before, of 46.3 kg./mm.$^2$.

EXAMPLE 6

A mixture of 45 g. of azophthalic anhydride, 46 g. of resorcinol, 0.3 g. of para-toluenesulphonic acid, and 20 g. of benzene is heated for 2 hours at 185° C. 3.41 g. of water are collected. The residue is dissolved in 150 g. of N-methyl-pyrrolidone and the solution obtained is used for forming a laminate in accordance with the process described in Example 5. This laminate contains 15.9% by weight of resin and has a resistance to flexure on break of 46.6 kg./mm.$^2$.

EXAMPLE 7

350 g. of azophthalic anhydride are heated with 254 g. of phenol for 4 hours at 185° C. 24.8 g. of water are liberated and the residue is dissolved in 1170 g. of N-methyl-pyrrolidone. A laminate prepared as described in Example 5 has a resistance to flexure on break of 56.6 kg./mm.$^2$. After being left for 192 hours at 300° C., it has a resistance of 15.1 kg./mm.$^2$.

Another laminate prepared in the same manner has an initial resistance to flexure on break of 58.5 kg./mm.$^2$. After 250 hours at 250° C. the resistance is 33.1 kg./mm.$^2$ and, after 1000 hours at 250° C., it is 17.6 kg./mm.$^2$.

EXAMPLE 8

A mixture of 25.0 g. of axoxyphthalic anhydride and 35.2 g. of resorcinol is heated for 20 minutes at 120° C. and 0.25 g. of p-toluenesulphonic acid and 20 g. of benzene are then added. The mixture is brought to 180° C. for 5 minutes. The product obtained is dissolved in 100 cc. of N-methyl-pyrrolidone. A laminate prepared from the solution as described in Example 5 has a resistance to flexure on break of 44.8 kg./mm.$^2$.

EXAMPLE 9

32.3 g. of azophthalic acid are heated for 5½ hours at 180° C. with 36.8 g. of phenol, in the presence of 3.0 g. of para-toluenesulphonic acid. The quantity of water eliminated is 5.09 g. The mixture obtained is dissolved in 120 cc. of N-methyl-pyrrolidone. Starting from this solution, a laminate which has a resistance to flexure on break of 45.8 kg./mm.$^2$ is obtained by the procedure described in Example 5.

EXAMPLE 10

A mixture of 16.1 g. of azophthalic anhydride, 16.9 g. of azoxyphthalic anhydride, and 37.6 g. of phenol is heated for 5 hours at 180° C. in the presence of 0.3 g. of p-toluenesulphonic acid. The product obtained is dissolved in 120 cc. of N-methyl-pyrrolidone. This solution is used to prepare a laminate by the method of Example 5, having a resistance to flexure on break of 45.9 kg./mm.$^2$.

EXAMPLE 11

A mixture of 38.8 g. of azophthalic anhydride, 22.5 g. of phenol and 0.4 g. of p-toluenesulphonic acid is heated for 4 hours at 175° C. 1.95 g. of water are eliminated during the reaction. The mixture is cooled to about 100° C. and 140 g. of N-methyl-pyrrolidone are added. To half this solution, 13 g. of metaphenylene diamine are added.

By proceeding as indicated above, a laminate is obtained which has an initial resistance to flexure on break of 66 kg./mm.$^2$.

EXAMPLE 12

A mixture of 32.2 g. of azophthalic anhydride, 47.5 g. of metacresol, and 20 cc. of benzene is heated for 4 hours at 200° C. 2.9 g. of water are collected. The excess cresol is distilled off. After cooling and grinding, 47.4 g. of powder A having a softening point of the order of 230° C. are recovered.

This powder A is heated under nitrogen at 320° C. for 1 hour. After grinding and screening, a powder B having a softening point of the order of 400° C. is recovered.

9 g. of the powder B are placed in a cylindrical mould with a diameter of 50 mm. and heated for 10 minutes under a pressure of 200 kg./cm.$^2$. The resistance to flexure on break, measured as in Example 1, is 5.2 kg./mm.$^2$.

EXAMPLE 13

A mixture of 32.2 g. of azophthalic anhydride, 47.2 g. of p-cersol, and 20 cc. of benzene is heated for 4 hours at 200° C. 3.1 g. of water are collected. After distilling the excess p-cresol and cooling, 48.6 g. of powder A having a softening point of the order of 245° C. are recovered.

This powder A is heated under nitrogen at 320° C. for 1 hour. A powder B is obtained which has a softening point of the order of 425° C.

After grinding and screening, a moulded object is prepared as in Example 12 by placing the powder in a press for 10 minutes at 375° C. under a pressure of 200 kg./cm.$^2$. The resistance to flexure on break is 8.2 kg./mm.$^2$. After being left for 504 hours at 300° C., it is still 5.5 kg./mm.$^2$.

EXAMPLE 14

A mixture of 100 g. of azophthalic anhydride, 116 g. of phenol, and 20 cc. of benzene is heated for 4 hours at 180° C. 60 g. of water are collected.

The mixture is cooled and, when the temperature reaches 40° C., 200 cc. of acetone which dissolves the phenol and the major part of the polymer are added. The mixture is then poured into a litre of cyclohexane, kept at 30° C., and stirred for 1 hour with a turbine rotating at 8000 r.p.m. The polymer in suspension is filtered and then washed with a cyclohexane-acetone mixture in a volumetric proportion of 10/1. 130 g. of polymer A are collected. The polymer A is heated for 2 hours at 320° C. After grinding and screening, a powder B is obtained which has a softening point of the order of 405° C. A moulding is carried out, as before, by introducing the mixture into a press for 10 minutes at 370° C. and under a pressure of 200 kg./cm.$^2$. Its resistance to flexure on break is 7.8 kg./mm.$^2$. After 500 hours at 300° C., this resistance is still 7.3 kg./mm.$^2$.

We claim:
1. A polymer obtained by polycondenastion at 100° to 450° C. of a monophenol or polyphenol selected from the group consisting of phenol, the cresols, pyrocatechol, resorcinol, hydroquinone, anthrahydroquinone, 1,2,3-, 1,2,4- and 1,3,5-trihydroxybenzenes, trimethylolphenol, the naphthols, the dihydroxy-biphenyls, bis-(4-hydroxy- phenyl)methane and bis-2,2-(p-hydroxyphenyl) propane, with a diahydride of formula:

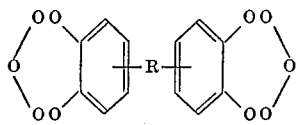

or a corresponding tetracid, in which R represents —N=N— or

the molar ratio of said phenol to said dianhydride being greater than 0.5:1.

2. A polymer according to claim 1 made by first heating the starting materials at between 100 and 400° C. until at least 0.5 mole of water per mole of dianhydride has been removed, and then heating the polymer obtained to 200 to 450° C.

3. A polymer according to claim 2 in which the first heating is to between 120 and 250° C. and the second is to 280 to 400° C.

4. A polymer according to claim 2 in which 0.9 to 1.5 moles of water are eliminated in the first heating.

5. A polymer according to claim 2 in which the second heating is under pressure.

6. A polymer according to claim 2 which has been shaped prior to the second heating.

7. A polymer according to claim 1 made using 1.5 to 3 moles of phenol per mole of anhydride.

8. A polymer according to claim 1 made by heating the starting materials in the presence of para-toluenesulphonic acid.

9. A polymer according to claim 1 wherein the monophenol or polyphenol is phenol, resorcinol or a cresol.

References Cited
UNITED STATES PATENTS 3,441,538   4/1969   Marks _____ 260—49
3,442,857   5/1969   Thornton _____ 260—47

WILLIAM H. SHORT, Primary Examiner

L. L. LEE, Assistant Examiner

U.S. Cl. X.R.

117—123 D, 161 R; 161—192; 260—30.2, 30.6 R, 30.8 DS, 47 C, 67 R, 77.5 R, 77.5 AP, 78 R, 78 TF, 78.4 R